March 27, 1934.   A. LANGSNER   1,952,134
SLIDE RULE
Filed Dec. 1, 1932
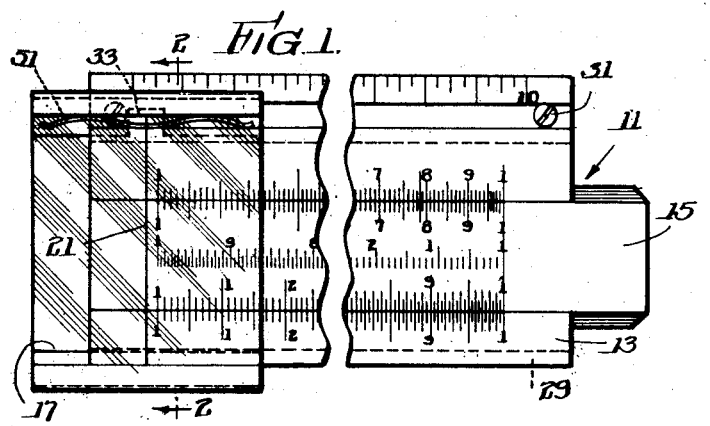
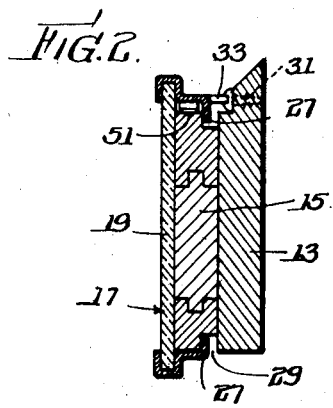
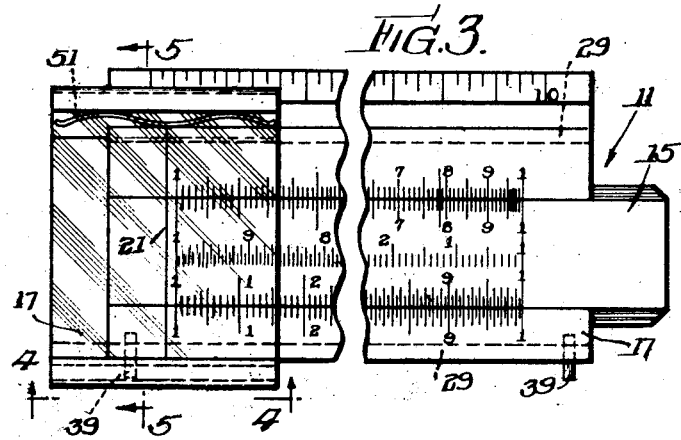
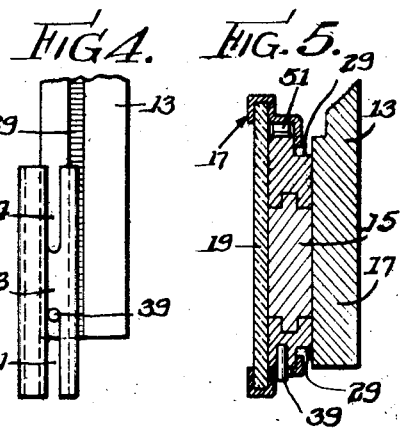

Patented Mar. 27, 1934

1,952,134

UNITED STATES PATENT OFFICE 1,952,134

SLIDE RULE

Adolph Langsner, Chicago, Ill., assignor to Eugene Dietzgen Company, Chicago, Ill., a corporation of Delaware Application December 1, 1932, Serial No. 645,275

6 Claims. (Cl. 235—70)

My invention relates in general to calculating devices and has more particular reference to slide rules.

In devices of this general character, a runner is ordinarily provided for sliding movement along the rule in order to assist in the manipulation of the rule in calculating. Ordinarily, the runner is mounted on the rule and may be detached at either end of the rule by a simple sliding movement beyond the ends of the rule. This may occur accidentally during the manipulation of the rule and it is the purpose of my present invention to provide means for preventing the accidental movement of the runner.

Another important object is to provide a slide rule having a runner which cannot be accidentally removed from operative position on the rule but which can be detached if desired.

Another important object is to provide a slide rule having a runner and means to prevent accidental detachment of the runner from the rule without increasing the size of the rule or affecting the manipulation of the same in calculating.

Another important object is to provide a neat, compact slide rule construction in which the runner of the rule is normally prevented from overrunning at the ends of the rule.

Still another object of the invention is to provide a slide rule with a neat compact, readily removable stop at the end of the rule for limiting the sliding movement of the runner so that the latter will not over-travel the end of the rule and become accidentally detached.

Another important object is to provide the slide rule with a runner stop to prevent the accidental removal of the runner at the end of the rule, the runner being formed to overlie the stop when at the limit of its travel in order to permit the hair line of the runner to register with the terminal graduations of the rule.

Another object of the invention is to provide the runner of the slide rule with a stop engaging portion and to form a stop on the rule in the path of movement of the stop engaging portion of the runner in order to permit the travel of the runner on the rule.

Still another important object is to provide the runner of the slide rule with a depending lug at a point intermediate the opposite sides of the runner and to provide the slide rule with a removable stop lying in the path of movement of the runner lug in order to limit the movement of the runner at the opposite ends of the rule while permitting the central portions of the runner, carrying the hair line, to be placed in registration with the initial and terminal graduations of the slide rule without extending the actual length of the rule.

Another object is to form the runner with spring means normally securing the runner on the rule in position to engage cooperating stops to prevent the runner from passing a predetermined point preferably at the end of the rule to prevent the accidental detachment of the runner, the spring means being yieldable to permit the runner to be detached from the rule.

Numerous other objects and advantages of the invention will be apparent from the following description, which taken in connection with the accompanying drawing, discloses a preferred embodiment of the invention.

Referring to the drawing:

Figures 1 and 3 are top plan views of slide rules having runners mounted thereon in accordance with my present invention; and Figures 2, 4, and 5 are vertical sections taken substantially along the lines 2—2, 4—4, 5—5 in Figures 1—3.

To illustrate my invention, I have shown on the drawing slide rules 11 comprising, in each instance, a body portion 13 and a slide 15 and a runner 17 mounted on the body portion for sliding movement throughout the length thereof.

The runner may comprise a glass plate 19 having a hair line 21 formed thereon in any suitable manner, the plate being mounted in a preferably sheet metal frame comprising, in the illustrated embodiment, clips 23 mounted on the plate at the opposite edges thereof.

In the drawing the clips are shown permanently secured to the plate, but obviously the clips may be removably fastened to the plates as by means of suitable fastening members if desired.

Obviously, the clips may be formed of sheet material suitably configurated as shown in the drawing, or may take the form of blocks made of suitable moldable material, which may be fastened to the plate either permanently or in a removable manner to form a runner.

The slide is preferably formed with inturned lugs 27 preferably constructed by bending the edges of the clips 23 inwardly toward each other at a point spaced from the plate 19. These lugs are adapted to run in grooves 29 formed in the body of the slide rule on the opposite edges thereof in order that the runner may travel freely from end to end of the body of the slide rule with the plate 19 thereof snugly engaging the upper surfaces of the slide and body, which are suitably graduated with cooperating scales.

In operating the slide rule, the hair line of the runner cooperates with the scales graduated on the slide and body of the rule between the initial and terminal graduations of the scales formed on the body and, as far as the manipulation of the rule is concerned, it is unnecessary to permit the runner to travel in either direction along the rule beyond the initial and final graduations of the scales formed on the body of the rule.

For convenience, however, the surface of the body is provided with a small margin between the initial and final graduations of the scale and the end of the rule and I have provided means for limiting the movement of the runner so that the hair line thereof may travel only slightly beyond the initial graduations of the scales so that the runner, while free to travel to all points on the body of the rule in which the hair line may register with a scale formed thereon, the slide may not accidentally over-travel and become detached from the body at its opposite ends. The travel limiting means may be conditioned, however, to permit the runner to be disassembled from the rule when it is necessary in order to clean the rule or replace the plate 19.

As illustrated in Figures 1 and 2 of the drawing, the travel limiting means comprises stops 31 mounted on the body of the rule at opposite ends thereof in position to engage a lug 33 carried by the runner. This lug is preferably formed by slitting the inturned flange 27 of one of the clips 23 intermediate the opposite edges of the clip in order to permit the portion of the lug 27 intermediate the slits preferably opposite the hair line to be bent downwardly to form a preferably relatively narrow stop lug 33 in position to interengage the stops 31.

The stops 31 may be of any suitable or convenient form but I prefer to utilize small screws which may be threaded into the body of the slide rule and may be quickly and easily removed as by means of a small screw driver or other turning instrument in order to permit the runner to be detached from the rule when desired.

In Figures 3, 4, and 5, I have shown a modified form wherein the stops comprise small pegs 39 seating into the edge of the body between the grooves 29 and the upper or graduated surface of the rule while one of the clips 23 of the runner is provided with slots 41 opening at the opposite edges of the clip and extending inwardly toward each other, the base of the slots 41 being separated substantially opposite the hair line of the runner so that when the runner is at one end of the rule, the pin 39 at said end will enter one of the slots 41 and by engaging the bottom of the slot will limit the travel of the runner in one direction, and when the runner is at the opposite end of the rule, the pin 39 at said end will enter the other slot and stop the travel of the runner when it engages the bottom of said slot.

The runners, also, may be provided with spring means 51 on one of the clips 23, to hold the other clip in its groove with the runner in position to cause interengagement of the co-operating stops, said other clip being formed so that, when the spring means is depressed, said other clip may be disengaged from its retaining groove in order to dismount the runner from the rule without removing the stop members on the rule. The spring means 51, where the clips are of metal, may be formed directly on the clip by striking out a spring piece from the clip or the spring means may be a separate piece attached to the clip in the proper position.

Among the manifest advantages of my present invention is the prevention of accidental displacement of the runner from the slide rule with consequent loss of time in the operation of the rule and the possibility of breakage of the plate 19 where the same is made of glass.

Numerous other objects and advantages will be apparent to those familiar with slide rules and it is obvious that numerous changes may be made in the form, construction, and arrangement of the several parts without departing from the spirit or scope of my invention, or sacrificing any of its attendant advantages, the forms herein described being preferred embodiments for the purpose of illustrating my invention.

Having thus described my invention, what I claim as new and desire to secure by Letters Patent is as follows:

1. A slide rule comprising a base, a pin mounted on the base near one end thereof, a runner slidable on the base, a slot in the runner to receive the pin when the runner is at the end of the slide rule, said pin adapted to stop the relative movement of the runner toward the end of the rule upon seating itself in the bottom of the slot.

2. A slide rule comprising a base member and a runner member slidably mounted on the base member, cooperating means formed in said members for stopping the relative movement between the runner and the base at a predetermined point in the length of the base, said cooperating means comprising a pin mounted on the base and a slot formed in the runner to receive the pin, the relative movement of the parts being checked by the engagement of the pin with the end of the slot.

3. A slide rule comprising a graduated base, a runner slidably mounted on the base and carrying sighting means thereon, a stop removably mounted on the base adjacent an end thereof and co-operating means formed on the runner substantially in alignment with the sighting means in position to engage the stop when the runner reaches a position on the end of the base in which the sighting means has passed beyond the terminal graduation of the rule.

4. A slide rule comprising a graduated base, a runner slidably mounted on the base and carrying sighting means thereon, a stop comprising a projection on a side edge of the base adjacent an end thereof and co-operating means formed on the runner substantially in alignment with the sighting means in position to engage the stop when the runner reaches a position at the end of the base with the sighting means thereof beyond the terminal graduation of the rule.

5. A slide rule comprising a graduated base, a runner having a metallic part slidably mounted on the base and carrying sighting means, a stop mounted on the base adjacent one end thereof and a co-operating lug formed on the runner substantially in alignment with the sighting means in position to engage the stop when the runner reaches a position at the end of the base with the sighting means beyond the terminal graduations of the rule, said lug comprising a struck-out portion on the metallic part.

6. A slide rule comprising a graduated base having grooves in the side edges, a runner having flanges adapted to engage in said grooves whereby to slidingly secure the runner for longitudinal movement on the base, said runner being formed with sighting means, a stop removably mounted on the base adjacent an end thereof and co-operating lug comprising a portion struck-out from one of said flanges substantially in alignment with said sighting means and arranged in position to engage said stop when the runner reaches a position at the end of the base in which the sighting means has passed beyond the terminal graduations of the rule.

ADOLPH LANGSNER.